Patented Nov. 3, 1936

2,059,787

UNITED STATES PATENT OFFICE 2,059,787

METHOD OF TREATING NUTS IN THE SHELL

William George Gow, Belleville, N. J., assignor to Charles Mauro, New York, N. Y.

No Drawing. Application February 19, 1935, Serial No. 7,291

4 Claims. (Cl. 99—231)

This invention relates to a method of treating edible nuts and particularly to a novel method of treating nuts of all kinds in the shell, whereby the exterior surface of the nut is cleaned and sealed and the general appearance of the shell of the nut is greatly improved, providing a more desirable product and materially increasing the salability thereof.

Many methods have been devised and used for improving the general appearance of nuts in the shell by artificial coloring or bleaching of the shell, but these former methods are expensive in their use and still very unsatisfactory in that the desired results are not entirely accomplished. Furthermore with artificial coloring or dyes, there is always the danger of injuring the kernel or meat of the nut within the shell.

The object of the present invention is the production of a method whereby, the natural characteristics of the nut shell are more clearly brought out, with respect to texture, color and general exterior appearance, in a simple, cheap and harmless manner and at the same time the pores in the shell are closed or sealed so that the natural oils of the nut kernel are preserved and retained.

According to the present invention, the nuts in the shell are placed in a gastight cylindrical chamber, preferably lined with stainless steel, and provided with inlet and outlet connections. Sufficient sulphur dioxide ($SO_2$) is then passed through the chamber to produce a concentration of about 50% $SO_2$ in air. Live steam is then injected into the tank and the connections closed allowing the nuts to remain under treatment for a period of about five minutes.

The pressure of the steam, as well as the moisture thereof, will produce the proper action of the sulphur dioxide ($SO_2$) on the surface of the shell and during this treatment there is also a slight chemical reaction with the essential oils on the outside surface of the nut shell resulting in a partial sealing of the pores of the shell and also the change in the original color of the nut shell, at the same time producing a clean surface.

The shade or color will vary according to the length of time the nuts are exposed to the $SO_2$ and steam mixture and no harmful effects will result due to this treatment.

After the sulphur dioxide ($SO_2$) and steam treatment, the exterior surface of the nut will be more or less rough. The nuts are then permitted to stand or dry for about ten minutes, after which they are next subjected to ultra-violet rays until the shells become smooth and have a polished appearance.

The ultra-violet ray treatment will also produce a shrinking and a further closing of the pores of the nut shell so that the natural oils of the nut kernel will be preserved within the shell and the meat of the nut will retain its natural and original flavor and texture for an indefinite period.

It is of course to be understood that the several steps in this process can be varied both as to time and sequence as long as the fundamental principles are followed and the desired results accomplished.

What I claim is:

1. The method of treating edible nuts in the shell to improve their appearance and retain their preserving qualities, which comprises impregnating the shell with sulphur dioxide ($SO_2$) under pressure and thereafter subjecting the shell to ultra-violet rays.

2. The method of treating edible nuts in the shell to improve their appearance and retain their preserving qualities, which comprises impregnating the shell with sulphur dioxide ($SO_2$) and steam and thereafter subjecting the shell to ultra-violet rays.

3. The method of treating edible nuts in the shell to improve their appearance and retain their preserving qualities, which comprises the following steps, placing the nuts in the shell in a gastight chamber, subjecting said shell to the action of sulphur dioxide ($SO_2$), next admitting live steam into the chamber, removing the shells from the chamber and finally subjecting the shells to ultra-violet rays.

4. The method of treating edible nuts in the shell to improve their appearance and retain their preserving qualities, which comprises the following steps, placing the nuts in the shell in a gastight chamber, subjecting said shell to the action of sulphur dioxide having a concentration of about 50% $SO_2$ in air, next admitting live steam into the chamber, allowing the shells to remain in the chamber for about five minutes, removing the shells from the chamber and finally subjecting said shells to ultra-violet rays until the shells assume a smooth appearance.

WILLIAM G. GOW.